(12) United States Patent
Kunzig

(10) Patent No.: US 11,047,435 B2
(45) Date of Patent: Jun. 29, 2021

(54) METHOD FOR ACTUATING A CLUTCH WITH A CLUTCH ACTUATION SYSTEM, AND A CLUTCH ACTUATION SYSTEM

(71) Applicant: Schaeffler Technologies AG & Co. KG, Herzogenaurach (DE)

(72) Inventor: Raphael Kunzig, Rheinstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 24 days.

(21) Appl. No.: 16/604,635

(22) PCT Filed: Apr. 12, 2018

(86) PCT No.: PCT/DE2018/100341
§ 371 (c)(1),
(2) Date: Oct. 11, 2019

(87) PCT Pub. No.: WO2018/206037
PCT Pub. Date: Nov. 15, 2018

(65) Prior Publication Data
US 2020/0158195 A1    May 21, 2020

(30) Foreign Application Priority Data
May 11, 2017   (DE) .......................... 102017110165.9

(51) Int. Cl.
*F16D 28/00*   (2006.01)
*F16D 48/06*   (2006.01)
*F16D 25/12*   (2006.01)

(52) U.S. Cl.
CPC .......... *F16D 48/066* (2013.01); *F16D 25/12* (2013.01); *F16D 28/00* (2013.01); *F16D 2500/316* (2013.01)

(58) Field of Classification Search
CPC ........ F16D 48/066; F16D 25/12; F16D 28/00; F16D 2500/316; F16D 2500/3026; F16D 2500/304; F16D 2500/7103
See application file for complete search history.

(56) References Cited

U.S. PATENT DOCUMENTS

| 5,198,761 A | 3/1993 | Hashimoto et al. |
| 2012/0016561 A1* | 1/2012 | Pinte ............. F16D 48/066 701/68 |
| 2015/0211603 A1 | 7/2015 | Koschig et al. |

FOREIGN PATENT DOCUMENTS

| CN | 106574673 | 4/2017 |
| DE | 102008024087 | 11/2009 |
| DE | 1020100003499 | 10/2011 |
| DE | 1020122218255 | 5/2013 |

(Continued)

*Primary Examiner* — David J Hlavka
(74) *Attorney, Agent, or Firm* — Volpe Koenig

(57) ABSTRACT

A method for actuating a clutch with a clutch actuation system, wherein an axially moveably mounted first piston (4) arranged on a master-side is moved via an electric motor, and the movement thereof is transmitted via a hydraulic section (8) to a second piston (10) positioned on a slave-side, which second piston actuates the clutch (11), wherein a path change triggered by the movement is measured and evaluated. In a method, in which a path change can be immediately measured, the path change of the clutch (11) detected on the slave-side is converted into an acoustic signal, which is transmitted via the hydraulic section (8) to the master-side for evaluation.

17 Claims, 1 Drawing Sheet

(56) References Cited

FOREIGN PATENT DOCUMENTS

| | | |
|---|---|---|
| DE | 102015221533 | 5/2016 |
| EP | 0420154 | 4/1991 |
| JP | S63277912 | 11/1988 |
| WO | 2014206428 | 12/2014 |

* cited by examiner

METHOD FOR ACTUATING A CLUTCH WITH A CLUTCH ACTUATION SYSTEM, AND A CLUTCH ACTUATION SYSTEM

CROSS-REFERENCE TO RELATED APPLICATIONS

This application is a 371 National Phase of International Application No. PCT/DE2018/100341, filed Apr. 12, 2018, which claims the benefit of German Patent Application No. 10 2017 110 165.9, filed May 11, 2017, both of which are incorporated herein by reference as if fully set forth.

BACKGROUND

The disclosure relates to a method for actuating a clutch with a clutch actuation system, wherein an axially moveably mounted first piston arranged on a master side is moved by an electric motor, and the movement thereof is transmitted via a hydraulic section to a second piston positioned on a slave side, which second piston actuates the clutch, wherein a change in travel caused by the movement is measured and evaluated, and to a clutch actuation system for carrying out the method.

DE 10 2012 218 255 A1 discloses a method for actuating a clutch which has a hydrostatic actuator comprising a lead screw which is rotated in order to move a piston of a master cylinder in an axial direction, wherein a travel of the piston is ascertained with the aid of at least one sensor device. For this purpose, the piston is assigned a travel feeler in order to compare the actual travel with the travel ascertained. The travel of the piston of the master cylinder can be determined with the aid of a pressure sensor or a travel sensor device.

The disadvantage here is that the engagement travel of the clutch is determined via the actuator travel, which represents an indirect measurement. Admittedly, the position of the actuator is known, and therefore the release travel of the clutch can be calculated. However, the hydraulic section is subject to disturbances which can only partially be taken into account by arithmetic compensation. These disturbances include thermal effects which must be canceled out by frequent sampling. However, there is always uncertainty as between the calculated actuator travel and the actual release travel of the clutch.

Moreover, measuring the release travel with a traditional travel sensor system is very difficult because of the prevailing conditions in the measuring environment due to a lack of space and high temperatures. Furthermore, an additional electric signal line and supply line to the sensor are required.

SUMMARY

It is the underlying object of the disclosure to indicate a method for actuating a clutch with a clutch actuation system, by which the release travel of the clutch can be reliably measured.

According to the disclosure, the object is achieved by virtue of the fact that the change in travel of the clutch detected on the slave side is converted into an acoustic signal, which is transmitted via the hydraulic section to the master side for evaluation. Here, the change in travel is detected directly on the slave side, and the acoustic signal representing the change in travel is acquired and processed by a suitable sensor system, electronics and software-based evaluation. The acoustic signal thus makes possible acoustic feedback on the slave-side axial movement of the components on the slave side and allows correct measurement of the actual travel of the clutch. Here, influences in the hydraulic section are suppressed. The use of the hydraulic section as a transmission element eliminates additional lines since the hydraulic fluid in the hydraulic section is particularly suitable for transmission.

In one embodiment, acoustic signals are generated as a function of the change in travel and are applied to the hydraulic section and recorded and counted on the master side, wherein an acoustic pulse corresponds to a predetermined change in travel. Thus, the evaluation electronics arranged on the master side need merely count the number of pulses to determine the travel of the clutch on the slave side. This results in a particularly simple evaluation method. Even where the second piston of the slave cylinder is not actuated by a master cylinder, a change in the hydraulic section can be detected easily by acoustic signals that occur, and these can then be taken into account as well during the actuation of the first piston on the master side since the slave cylinder is no longer in the desired initial position.

In one variant, a state of the hydraulic section is inferred from the strength and/or an acoustic spectrum of the acoustic signals and/or disturbance signals superimposed thereon. Thus, it is just as possible to make judgments on filling or leakage of the hydraulic section as on an extent of bleeding or the temperature. It is also possible to acquire and evaluate variables which are necessary for clutch actuation. Thus, a transmission input shaft runs through the clutch actuator, the rotational speed of which can be evaluated by the pulse spectrum. Here too, fine acoustic signals can be generated, applied to the hydraulic section and transmitted for evaluation.

One development of the disclosure relates to a clutch actuation system, comprising a clutch actuator, which has an electric motor, connected to a transmission, for actuating a first piston axially moveably mounted in a master cylinder of the clutch actuator, wherein the clutch actuator, which is positioned on a master side, is connected via a hydraulic section to a second piston of a slave cylinder on a slave side, which second piston is in an operative connection with the clutch via a release bearing, and to a travel measuring device. In a clutch actuation system in which the actual release travel of the clutch is measured directly, a travel measuring device which outputs acoustic output signals is arranged on the slave side for the purpose of detecting a change in travel of the clutch and is connected via a transmission section that transmits the acoustic signals to a receiving device, to which an evaluation device is connected.

A rack for detecting the change in travel of an axially moveable component on the slave side advantageously acts on a diaphragm in order to generate acoustic pulses. As a result, the change in travel on the slave side is converted into acoustic pulses, wherein each step of the rack corresponds to a predetermined change in travel, with the result that each pulse likewise corresponds to a change in travel. Therefore, all that is required is to count the pulses in the evaluation in order to obtain information on the change in travel.

In one variant, the pulse generator device is arranged parallel to a transmission axis and has a plurality of radial projections on a circumference for the actuation of the diaphragm. During a movement of the rack, acoustic signals are reliably generated by the diaphragm by virtue of the projections of the pulse generator device.

In one embodiment, a transmission for transforming the axial motion of the rack into a rotation is arranged between the rack and the diaphragm, wherein the transmission interacts with a pulse generator device, which actuates the diaphragm. During each change in the position of the rack by one step, the transmission is moved. The pulse generator device engaging in the transmission is thereby likewise rotated, thereby actuating the diaphragm and triggering the acoustic signal.

In one embodiment, the travel measuring unit, which outputs acoustic output signals, is secured firmly on the second piston of the slave cylinder or the release bearing or the clutch itself. All these components are axially moveable on the slave side and travel a change in travel due to a change in the hydraulic section, in particular when there is a displacement of the volume in the hydraulic section by an actuation of the master cylinder of the clutch actuator.

In one variant, the transmission section is formed by the hydraulic section which connects the travel measuring device arranged on the slave side, which outputs the acoustic output signals, to the receiver device, which is arranged on the clutch actuator. Using this embodiment, it is possible to avoid additional lines between the slave cylinder and the master cylinder since the acoustic travel measuring device is connected via the hydraulic section, which is present in any case, to a receiver arranged on the master side.

It is advantageous if the receiver device is designed as a microphone which comprises a piezoelectric or inductive sensor system. Since such microphones are widely available, the receiver device thus represents a low-cost component, thus enabling the costs for electronics in the clutch actuation system to be reduced.

BRIEF DESCRIPTION OF THE DRAWINGS

The disclosure allows numerous embodiments. One of these will be explained in greater detail with reference to the figures of the drawings.

In the drawings.

DETAILED DESCRIPTION

Figure 1:
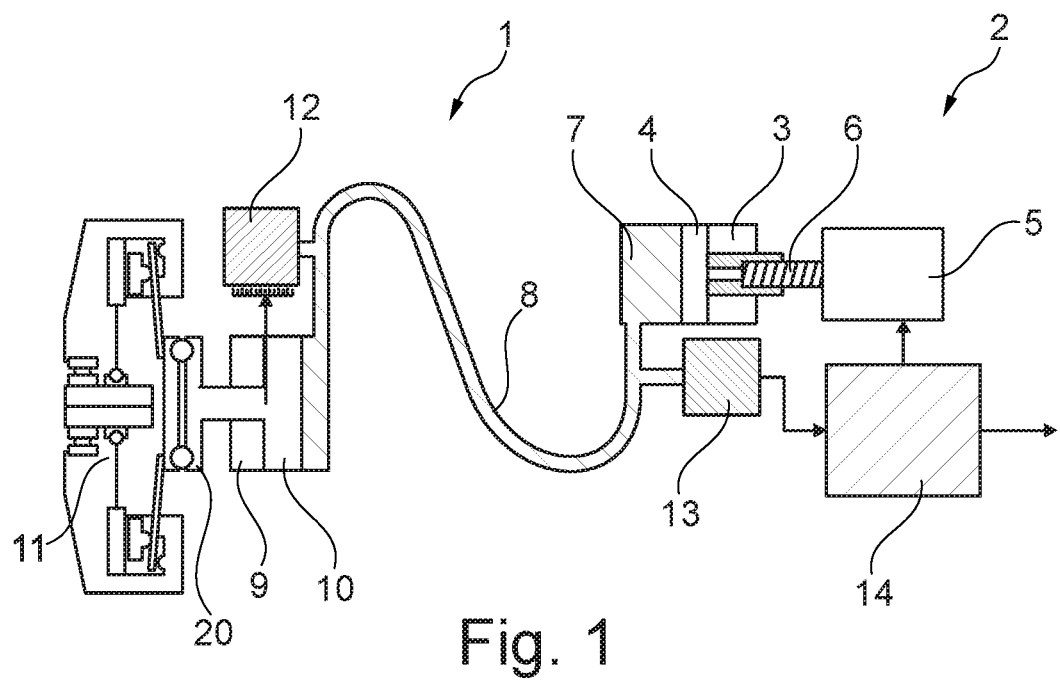
FIG. 1: an illustrative embodiment of an automated clutch actuation system according to the disclosure

An illustrative embodiment of an automated clutch actuation 1 system according to the disclosure, of the kind used in motor vehicles, is illustrated in FIG. 1. Here, the clutch actuation system 1 comprises a clutch actuator 2, which comprises a master cylinder 3. In this system, the first piston 4, which is arranged in the master cylinder 3, is driven by an electric motor 5, wherein the rotary motion of the electric motor 5 is converted by a lead screw 6 into a linear motion of the first piston 4 of the master cylinder 3. The master cylinder 3 is connected via a hydraulic section 8 filled with a hydraulic fluid 7 to a slave cylinder 9, which has a second piston 10, which actuates the clutch 11 via a release bearing 10 when the volume of the hydraulic fluid 7 in the hydraulic section 8 is displaced. An acoustic sensor 12, which is connected to the hydraulic section 8, is positioned on the second piston 10 of the slave cylinder 9. On the master side, the hydraulic section 8 is connected to an acoustic receiver 13, which is coupled in turn to a control unit 14, which controls the electric motor 3 or outputs output signals to other motor vehicle modules.

If the electric motor 3 receives a signal from the control unit 14 to the effect that the clutch 11 should be opened or closed, this electric signal is converted into a movement of the first piston 4, which moves to the left and, in the process, displaces a volume of the hydraulic fluid 7. Using this displaced volume, the second piston 10 on the slave cylinder 9 is moved and the clutch 11 is thereby actuated. With the movement of the second piston 10, a change in travel is also detected by the acoustic sensor 12 positioned on the second piston 10 of the slave cylinder 9.

Figure 2:
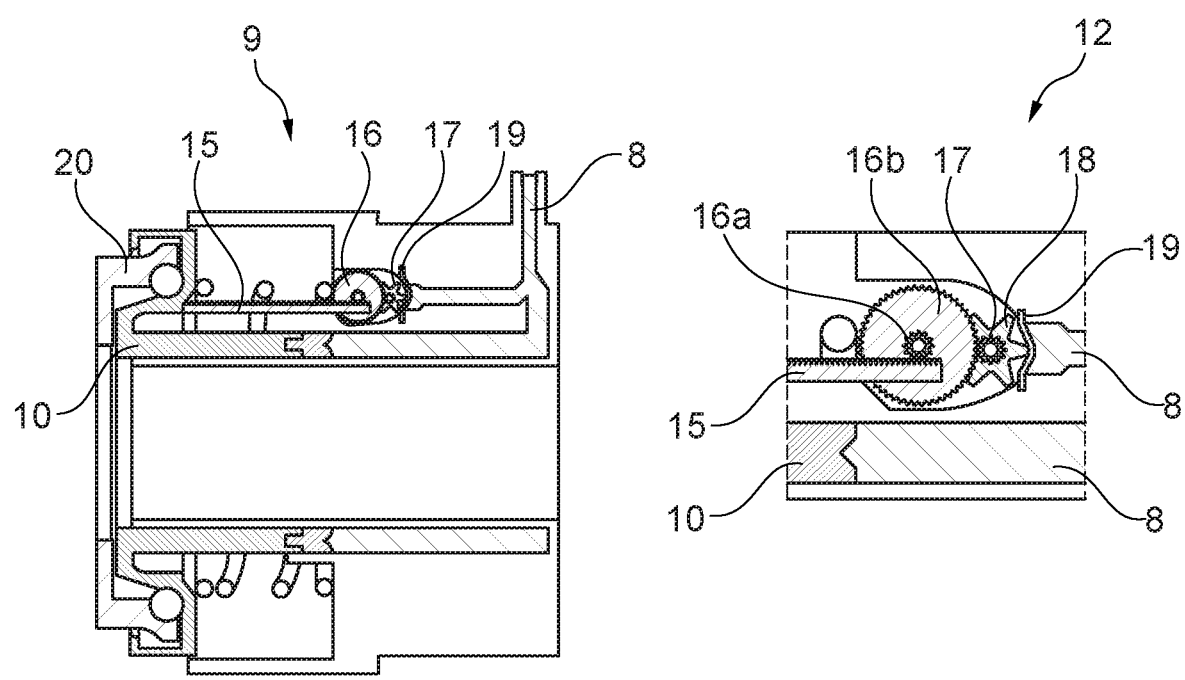
FIG. 2: an illustrative embodiment of a slave cylinder as per FIG. 1.

This acoustic sensor 12 is illustrated in greater detail in FIG. 2. Here, the sensor 12 comprises a rack 15, which is secured on the second piston 10, parallel to the latter. This rack 15 moves a transmission 16 by engaging on a first gearwheel 16a. This first gearwheel 16a is connected for conjoint rotation to a second gearwheel 16b, which has a larger outside radius. A pulse generating device 17 engages in this larger outside radius. In the example under consideration, this pulse generating device 17 preferably has a star-shaped cross section, with the result that, during a movement of the rack 15 by a predetermined number of steps, the individual radial projections 18 of the pulse generating device 17 are moved by the second gearwheel 16b, thereby striking a diaphragm 19 when a projection 18 of the pulse generator device 17 makes contact with the diaphragm 19. With each contact of a projection 18 of the pulse generator device 17 with the diaphragm 19, a fine acoustic pulse is in each case generated by the diaphragm 19 and transmitted to the hydraulic section 8, where this pulse is transmitted to the acoustic receiver 13 on the master side of the clutch actuation system 1. The receiver 13 is designed as a microphone with a piezoelectric or inductive sensor system, whereby the acoustic pulses are converted into electric pulses. These electric signals, in turn, are evaluated by the control unit 14 by corresponding software in order to ascertain the release travel of the clutch 11 measured directly on the slave side. This release travel is then made available for further clutch actuation or for other system components of the vehicle.

The present solution is suitable for all hydraulic clutch actuation systems in which implementation of a sensor signal channel appears worthwhile. Here, the functionality of the signal feedback is controlled via the hydraulic section.

LIST OF REFERENCE SIGNS 1 clutch actuation system
2 clutch actuator
3 master cylinder
4 piston
5 electric motor
6 lead screw
7 hydraulic fluid
8 hydraulic section
9 slave cylinder
10 piston
11 clutch
12 sensor
13 receiver
14 control unit
15 rack
16 transmission
16a gearwheel
16b gearwheel
17 pulse generating device
18 projection
19 diaphragm
20 release bearing

The invention claimed is:

1. A method for actuating a clutch with a clutch actuation system, the method comprising:

moving an axially moveably mounted first piston arranged on a master side using an electric motor;

transmitting a movement of the first piston via a hydraulic section to a second piston positioned on a slave side;

actuating the clutch with the second piston;

measuring and evaluating a change in travel caused by the movement by converting the change in travel of the clutch detected on the slave side into an acoustic signal; and transmitting the acoustic signal via the hydraulic section to the master side for evaluation.

2. The method as claimed in claim 1, further comprising generating acoustic pulses as a function of the change in travel, applying the acoustic pulses to the hydraulic section, and recording and counting the acoustic pulses on the master side, wherein one said acoustic pulse corresponds to a predetermined change in travel.

3. The method as claimed in claim 1, further comprising inferring a state of the hydraulic section from at least one of: a strength of the acoustic signals, an acoustic spectrum of the acoustic signals, or disturbance signals superimposed on the acoustic signals.

4. A clutch actuation system, comprising:
a clutch actuator including an electric motor, a transmission connected to the electric motor, a first piston connected to the transmission and axially moveably mounted in a master cylinder of the clutch actuator, wherein the clutch actuator is positioned on a master side;
a hydraulic section;
a slave cylinder on a slave side, the slave cylinder including a second piston, and the second piston is connected to the clutch actuator via the hydraulic section, the second piston is configured to be in an operative connection with a clutch via a release bearing;
a travel measuring device that outputs acoustic output signals arranged on the slave side, the travel measuring device being configured to detect a change in travel of the clutch and being connected via the transmission section that transmits the acoustic signals to a receiving device; and
an evaluation device connected to the receiving device.

5. The clutch actuation system as claimed in claim 4, further comprising a rack that detects the change in travel of an axially moveable component on the slave side, and a diaphragm, the rack acts on a diaphragm in order to emit acoustic pulses as the acoustic output signals.

6. The clutch actuation system as claimed in claim 5, further comprising a rack transmission configured to transform an axial motion of the rack into a rotation arranged between the rack and the diaphragm, wherein the rack transmission interacts with a pulse generator device that actuates the diaphragm.

7. The clutch actuation system as claimed in claim 6, wherein the pulse generator device is arranged parallel to a transmission axis and has a plurality of radial projections on an circumference for actuating the diaphragm.

8. The clutch actuation system as claimed in claim 4, wherein the travel measuring device that outputs acoustic output signals, is secured on the second piston of the slave cylinder or the release bearing or the clutch.

9. The clutch actuation system as claimed in claim 4, wherein the transmission section is formed by the hydraulic section which connects the travel measuring device arranged on the slave side, which outputs the acoustic output signals, to the receiver device, which is arranged on the clutch actuator.

10. The clutch actuation system as claimed in claim 4, wherein the receiver device comprises a microphone which includes a piezoelectric or inductive sensor system.

11. A clutch actuation system, comprising:
a clutch actuator including a first piston axially moveably mounted in a master cylinder, the clutch actuator being positioned on a master side;
a hydraulic section;
a slave cylinder on a slave side, the slave cylinder including a second piston, and the second piston is connected to the clutch actuator via the hydraulic section, the second piston is configured to be in an operative connection with a clutch;
a travel measuring device that outputs acoustic output signals arranged on the slave side, the travel measuring device being configured to detect a change in travel of the clutch and being connected via the transmission section that transmits the acoustic signals to a receiving device; and
an evaluation device connected to the receiving device.

12. The clutch actuation system of claim 11, further comprising a rack that detects the change in travel of an axially moveable component on the slave side, and a diaphragm, wherein the rack acts on a diaphragm in order to emit acoustic pulses as the acoustic output signals.

13. The clutch actuation system of claim 12, further comprising a rack transmission configured to transform an axial motion of the rack into a rotation arranged between the rack and the diaphragm, wherein the rack transmission interacts with a pulse generator device that actuates the diaphragm.

14. The clutch actuation system of claim 13, wherein the pulse generator device is arranged parallel to a transmission axis and has a plurality of radial projections on an circumference for actuating the diaphragm.

15. The clutch actuation system of claim 11, wherein the clutch actuator includes an electric motor and a transmission configured to axially move the first piston.

16. The clutch actuation system of claim 11, wherein the travel measuring device that outputs acoustic output signals is secured on the second piston of the slave cylinder.

17. The clutch actuation system of claim 11, further comprising a release bearing and a clutch, the second piston is configured to act on the clutch via the release bearing, and the travel measuring device that outputs acoustic output signals is secured on the release bearing or the clutch.

* * * * *